(12) United States Patent
Freeze

(10) Patent No.: US 8,027,745 B1
(45) Date of Patent: Sep. 27, 2011

(54) NON-LINEAR, ANIMATED, INTERACTIVE ASSEMBLY GUIDE AND METHOD FOR CONTROLLING PRODUCTION

(75) Inventor: Wayne S. Freeze, Germantown, TN (US)

(73) Assignee: Electrical Controls, Inc., Collierville, TN (US)

( * ) Notice: Subject to any disclaimer, the term of this patent is extended or adjusted under 35 U.S.C. 154(b) by 1063 days.

(21) Appl. No.: 11/365,131

(22) Filed: Mar. 1, 2006

Related U.S. Application Data (60) Provisional application No. 60/657,613, filed on Mar. 1, 2005.

(51) Int. Cl.
G06F 19/00 (2006.01)

(52) U.S. Cl. ........................ 700/106; 700/111

(58) Field of Classification Search .............. 700/106, 700/107, 111
See application file for complete search history.

(56) References Cited

U.S. PATENT DOCUMENTS

| | | | |
|---|---|---|---|
| 4,961,148 A * | 10/1990 | Holda et al. ................ | 700/97 |
| 5,771,043 A * | 6/1998 | Nigawara et al. ........... | 345/419 |
| 6,188,402 B1 * | 2/2001 | Csipkes et al. ............. | 715/705 |
| 6,345,207 B1 * | 2/2002 | Nitta et al. ................. | 700/83 |
| 6,453,209 B1 * | 9/2002 | Hill et al. ................... | 700/95 |
| 6,477,437 B1 * | 11/2002 | Hirota ......................... | 700/95 |
| 6,725,184 B1 * | 4/2004 | Gadh et al. ................. | 703/2 |
| 6,788,987 B2 * | 9/2004 | Slechta et al. ............. | 700/106 |
| 6,819,965 B2 * | 11/2004 | Beatty et al. ............... | 700/97 |
| 2003/0163219 A1 * | 8/2003 | Flesher ....................... | 700/185 |
| 2004/0225390 A1 * | 11/2004 | Keller et al. ................ | 700/95 |
| 2005/0058969 A1 * | 3/2005 | Matthews ................... | 434/118 |
| 2006/0085088 A1 * | 4/2006 | Nakayama et al. ......... | 700/97 |

FOREIGN PATENT DOCUMENTS

EP      1065603 A2 *  1/2001

* cited by examiner

Primary Examiner — Ryan A Jarrett
(74) Attorney, Agent, or Firm — Wyatt, Tarrant & Combs, LLP; William S. Parks; Matthew A. Williams (57) ABSTRACT

A non-linear, animated, interactive assembly guide, and a method and system for creating, using, and managing non-linear, animated, interactive assembly guides to facilitate the assembly of one or more articles of manufacture. The method includes identifying the parts, tools, and test fixtures necessary to create a particular article; creating a three-dimensional graphic representing each said part, tool and test fixture; annotating said graphics; combining said graphics according to a sequence to create a non-linear, animated, interactive assembly guide; displaying said assembly guide where an assembler can observe it while assembling an article; and managing access to said guides.

20 Claims, 6 Drawing Sheets

System for creating, using, and managing non-linear, animated, interactive assembly guides

FIG. 1

System for creating, using, and managing non-linear, animated, interactive assembly guides FIG. 2
Design Tool Function Overview FIG. 3
Composition Tool
Function Overview FIG. 4
Assembly Guide Player Function Overview FIG. 5
Administrative Utility
Function Overview FIG. 6
Assembly Guide States

NON-LINEAR, ANIMATED, INTERACTIVE ASSEMBLY GUIDE AND METHOD FOR CONTROLLING PRODUCTION

CROSS-REFERENCE TO RELATED APPLICATIONS

This application claims priority to U.S. Provisional Application 60/657,613 filed on Mar. 1, 2005.

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The present invention generally relates to the methodology of illustrating and prompting the assembly of an on-line manufacture of products wherein there is included a computer controlled architecture for using real-time, three dimensional graphics to create non-linear, interactive animations in conjunction with interactive assembly instructions.

BACKGROUND OF THE INVENTION

In a manufacturing environment, workers are tasked with the responsibility to create a product that is ready for shipment. A product is created from a collection of parts and assemblies identified by a bill of materials and built according to a series of assembly instructions. A part used in the manufacture represents a single item used in the assembly process. Associated with a part is information such as a part number, description, and various information related to location sourcing and the like.

An assembly is the combination of a collection of parts, which represents the end result, or the product manufactured, of an assembly process. A subassembly represents a component, which can be treated as a part in another assembly process, while a final assembly is the ultimate output from the assembly process, which represents a product ready for shipment.

A bill of materials contains a list of parts and assemblies including quantities needed to create the product, while the assembly instructions document the steps necessary to combine the parts and assemblies together to create the product.

Typically the assembly process is divided up among multiple workers, where each worker is responsible for completing a subset of tasks necessary to build an assembly. Each worker is assigned a fixed amount of time to complete these tasks, which is known as the task time. The dividing line between the subset of tasks is known as a fence.

The role of a user is to study the assembly process and determine the methods that should be used to assemble a particular product from the parts and subassemblies identified on the bill of materials. This method is then transformed into a document known as assembly instructions.

Assembly instructions often take the form of a paper document that outlines the individual steps needed to assemble the product. These steps may consist of simple text, or they may consist of text supplemented with graphics such as a picture or a schematic diagram. Once developed, the assembly instructions are copied and distributed to various locations on the assembly line for use by the workers as needed.

In the conventional manufacturing process, the sequence of operations is an aggregation of finite steps that are performed by the assembly worker, generally without prompting or continuing interactive assistance.

The present invention adds both a graphical interface to the manufacturing process enabling the individual worker to visualize their particular actions as well as receive interactive prompting on the process confirming successful assembly or corrective suggestion for incorrect or unsuccessful steps.

DESCRIPTION OF THE PREFERRED EMBODIMENTS (S)

Architecture Overview

Figure 1:
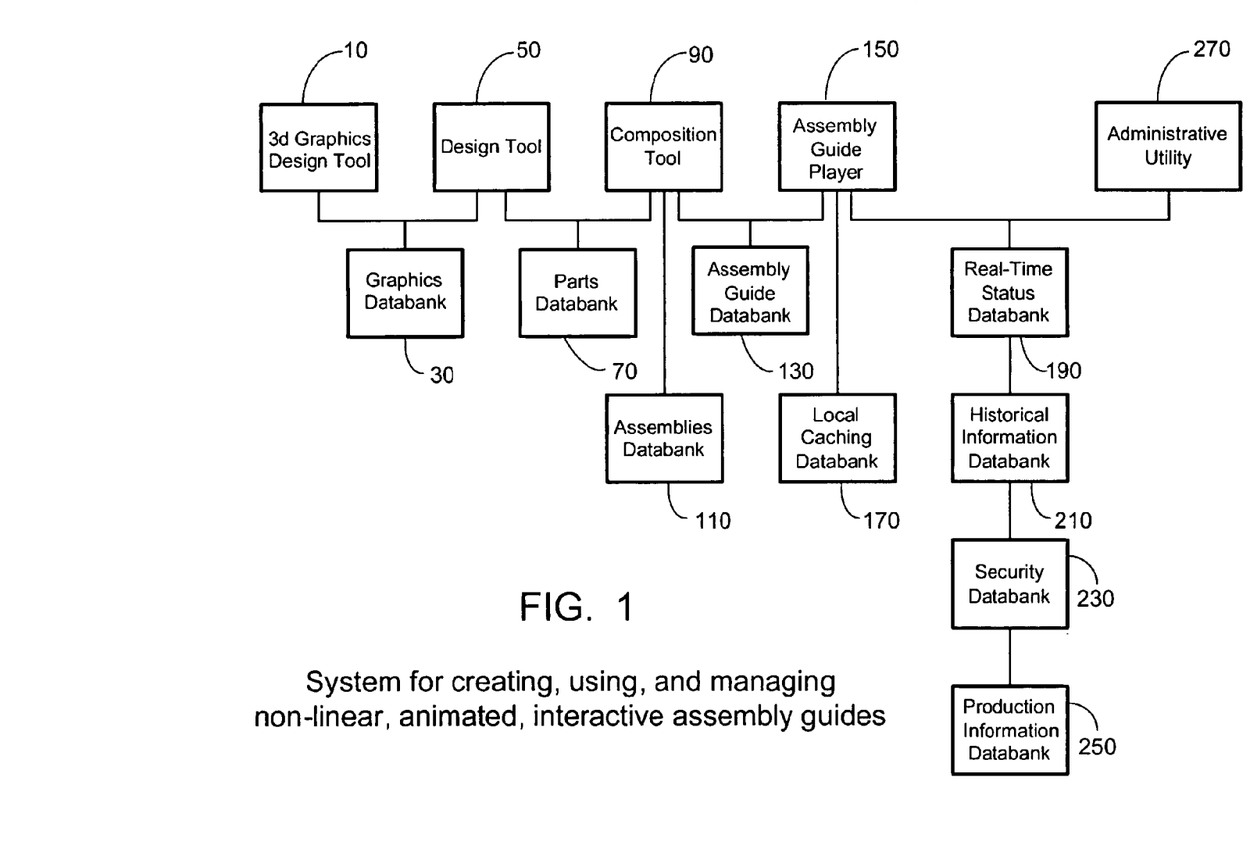
FIG. 1 is a block diagram illustrating the top-level architecture for developing, using, and managing non-linear, animated, interactive assembly guides.

The use of non-linear, animated, interactive assembly guides represents a unique approach to providing workers with assembly instructions to assemble and test products created in a manufacturing environment (see FIG. 1). The key steps in the process are:
  Collecting information required to create a non-linear, animated, interactive assembly guide.
  Creating three-dimensional graphics for use in the non-linear, animated, interactive assembly guide.
  Converting said three-dimensional graphics into annotated graphics using a design tool.
  Building said non-linear, animated, interactive assembly guide using a composition tool.
  Playing said non-linear, animated, interactive assembly guide using an assembly guide player.
  Managing said non-linear, animated, interactive assembly guides using an administrative utility.

In order to create a non-linear, animated, interactive assembly guide ("assembly guide"), the user responsible for creating the assembly guide must identify all of parts that will be shown in the assembly guide and the order that they are added to the assembly. Typically, this information is found in a bill of materials for the assembly.

Once the complete list of parts is identified, each part must then be represented by a three-dimensional computer graphic. These graphics are typically created with a three-dimensional graphics design tool (10), such as Maya. Once created, these graphics are stored in graphics databank (30) for use by design tool (50).

The three-dimensional computer graphics generated by graphics design tool (10) can be created directly by a graphic artist or by importing information from a three-dimensional Computer Aided Design package and making any appropriate adjustments necessary for the imported graphics to be used as part of an assembly guide.

Design tool (50) is a utility program that defines the part for use by composition tool (90). To do this, design tool (50) imports the three-dimensional computer graphics for each part (52), converts the format of the three-dimensional computer graphics to its own internal format (54), and allows the user to add information about the part such as the part number, a description of the part, who supplies the part, alternate suppliers, and the like, transforming each graphic into an annotated graphic (58).

Design tool (50) also identifies how parts may be connected together. This includes identifying the locations of various features of the part such as screw holes, wire connectors, etc. that serve as connection points for other parts.

Once the part has been defined by design tool (50), the part is stored in parts databank (70) for use by composition tool (90). Composition tool (90) in turn takes the information from parts databank (70) and uses it to update the information in assemblies databanks (110).

Creating an assembly guide with composition tool (90) begins with a bill of materials. The user identifies the sequence of steps needed to build the assembly from the collection of parts and subassemblies listed on the bill of materials. Typically each step adds one new part to the assembly.

Once the list of steps is complete, the user uses composition tool (90) to create one state for each step in the assembly process (96). Once the state exists, the user can select the appropriate part from parts databank (70) and add it to the assembly guide, along with any text instructions to be shown to the worker.

After the user has defined the individual states in composition tool (90), the user links them together to create assembly instructions (92). Generally one state leads to another state in sequential fashion as the parts are added to the assembly. However, during the assembly process, the worker may be required to perform various tests or respond to information presented on the display. Based on the results of the tests or worker responses, control may be transferred to one of several different states, this giving rise to the non-linear nature of the assembly guide. Once the assembly process is defined, the assembly guide is saved as a package that can be played by assembly guide player (150).

If the assembly process is to be divided among multiple workers, composition tool (90) allows the user to create fences that break the total assembly process into multiple groups of states. These fences allow assembly guide player (150) to jump directly to the appropriate assembly instructions that apply to a particular worker rather than forcing the worker to watch the entire assembly guide, even though the worker will only be performing a subset of the tasks shown.

Depending on the environment, assembly guide player (150) can be packaged as a standalone application, a function embedded inside another application, or included as part of a web page. All three variations of assembly guide player (150) provide the same core functionality, which includes features such as the ability to control the assembly guide through the use of a keyboard, mouse or other input device.

The different forms assembly guide player (150) may take permits assembly guides to be distributed in many forms such as over the Internet, on removable media such as CD-ROMs or DVD-ROMs, or over a private network.

Administrative utility (250) provides functions that permit someone to manage and analyze the environment in which the assembly guides are played. These functions include the ability to authenticate a user's access to the system; the ability to authorize a particular worker to access one or more assembly guides; and to define production schedules. Also administrative utility (250) includes the ability to analyze both real-time and historical data as static reports and through the use of graphical displays.

Overview of an Assembly Guide

Figure 6:
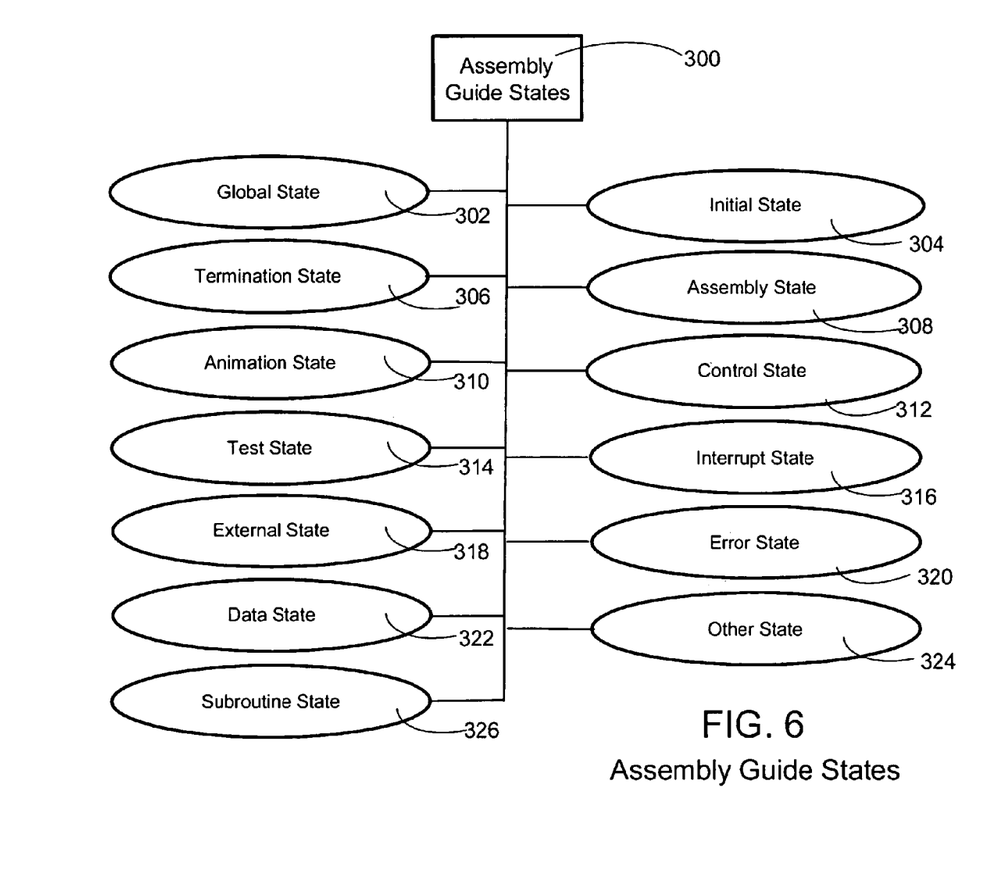
FIG. 6 is a block diagram which illustrates the successive operational modes in an animated, interactive assembly guide for a product.

An assembly guide consists of a series of individual states. Each state represents a single function that will be executed by assembly guide player (150). When assembly guide player (150) starts, initial state (302) is executed. When the processing of initial state (302) is complete, the next state will be identified and executed. This flow continues until the termination state is reached and playback of the assembly guide is complete.

When playback of the assembly guide is complete, the system will examine the current state to determine the next state that should be executed. For a simple set of assembly instructions that are always executed in sequence, the next state would reflect the next part to be added to the assembly. For a more complex set of assembly instructions, a script routine would be called to determine the next state. This allows the assembly guide to respond to factors other than a predetermined set of steps.

Depending on the type of state selected, the state can automatically perform a task such as displaying a work instruction, moving an object from one location on the screen to another, extracting information from a database, updating a database, and the like.

Whenever a new state is entered, a script routine is called to initialize the state. This routine in turn can be used to perform any required processing such as displaying a model, playing an animation sequence, or accessing an external database server.

In a more complex assembly guide, the use of script routines plays a more important role. Script routines can be called whenever the worker playing an assembly guide using assembly guide player (150) clicks on an object on the screen. This script routine could be used to perform a specific function such as extracting information from any source external to the assembly guide such as a database server or a web server or access real-time information from a control system.

Depending on the results of the information returned, the script routine could transfer control to another state, modify the graphical information displayed on the screen, or any other function. The only real limitations are the functions available to the scripting language used. By design, the user can use multiple scripting languages to maximize flexibility.

Once the user has defined the collection of states in composition tool (90), the user may then use composition tool (90) to attach text, sound, or both to each state (102). The text will be displayed on screen, while the sound will be played through the computer's sound system.

The user has the option to localize the text and sounds within each state for a particular language, such as English or Spanish. Thus the worker can automatically receive this information in their native language. The localization is accomplished using composition tool (90).

Because of the general-purpose nature of scripting languages, it may be practical to access external devices to test the assembly while the worker is assembling it. As each new state is entered, the user may be able to test one or more components in the assembly using a real-time hardware interface to the physical assembly operating under control of the assembly guide player. The hardware interface can perform actions and return the status of the assembly to the script. The script in turn will report the results to the worker. Assembly guide player (150) will then choose the next state based on the results and/or the worker's response—for example if a problem is directed assembly guide player (150) may choose a state that instructs the worker to perform further tests or provides instructions to resolve the problem.

Creating Three-Dimensional Graphics For Use In An Assembly Guide

The first step in the process of creating an assembly guide is to identify the parts needed for the assembly. If a part does not exist in parts databank (70), then it must be created using design tool (50) (see FIG. 2). Design tool (50) takes graphics found in graphics databank (30) and converts them to the format used by composition tool (90).

Figure 2:
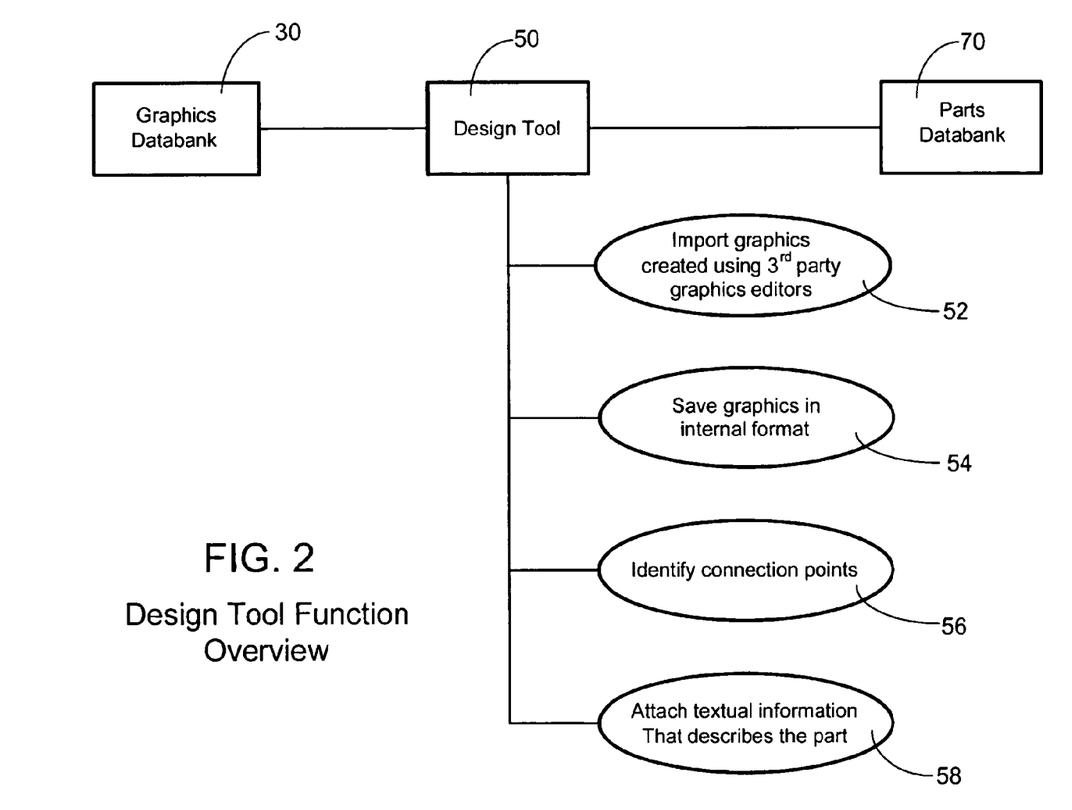
FIG. 2 is a block diagram which identifies the key features found in the design tool.

If suitable three-dimensional graphics are not available in graphics databank (30), then they must be created using either a three-dimensional graphics tool or a CAD/CAM tool. If the model is created using a CAD/CAM tool, then it may be desirable to use a three-dimensional graphics tool to update the model to enhance its appearance for display in an assembly guide. In either case, the completed graphic would be stored in graphics databank (30).

A part used in an assembly guide requires additional information beyond what is needed to draw the three-dimensional graphic on the screen. This information includes details about critical points on the virtualized part where other parts may be attached, along with animation sequences that operate on the graphic, lighting, and camera placement. This information is entered using design tool (50).

Design tool (50) looks for visual clues placed in the three-dimensional graphic when it was created using the three-dimensional graphics tool. Visual clues are created in the three-dimensional graphic by adding three-dimensional objects within the three-dimensional graphic and giving them specially formatted names. When a visual clue is found, the appropriate information is extracted and is used to determine the position of an object or any other characteristic that may be useful.

Since it is may not be possible or practical to supply all of this information using visual clues, facilities are included in design tool (50) to insert, review, and change this information on a part-by-part basis.

By default, the format of the graphics stored in graphics databank (30) is determined by the tool used to create the graphic. However, design tool (50) can read multiple three-dimensional graphic formats and convert them to its own format. When design tool (50) saves a part, it uses it own format exclusively to ensure that the additional information is properly saved.

In addition to preparing three-dimensional graphics for use in composition tool (90), design tool (50) allows the user to combine graphics and scripting code to create a smart object. The scripting code gives the designer the ability to control how the three-dimensional graphics object appears and behaves in an assembly guide.

Once the part has been defined, it is saved in parts databank (70) for use by the composition tool (90).

Building An Assembly Guide Using Composition Tool (90)

The second step (see FIG. 3) in the process of creating an assembly guide is to use composition tool (90) to define the process to create an assembly. Composition tool (90) uses the annotated graphics stored in parts databank (70). Once the user defines the process with composition tool (90), the process is then compiled into an assembly guide with composition tool (90) and saved to assembly guide databank (130). Prior to be compiled, the process is saved to assemblies databank (110) in an editable form.

Figure 3:
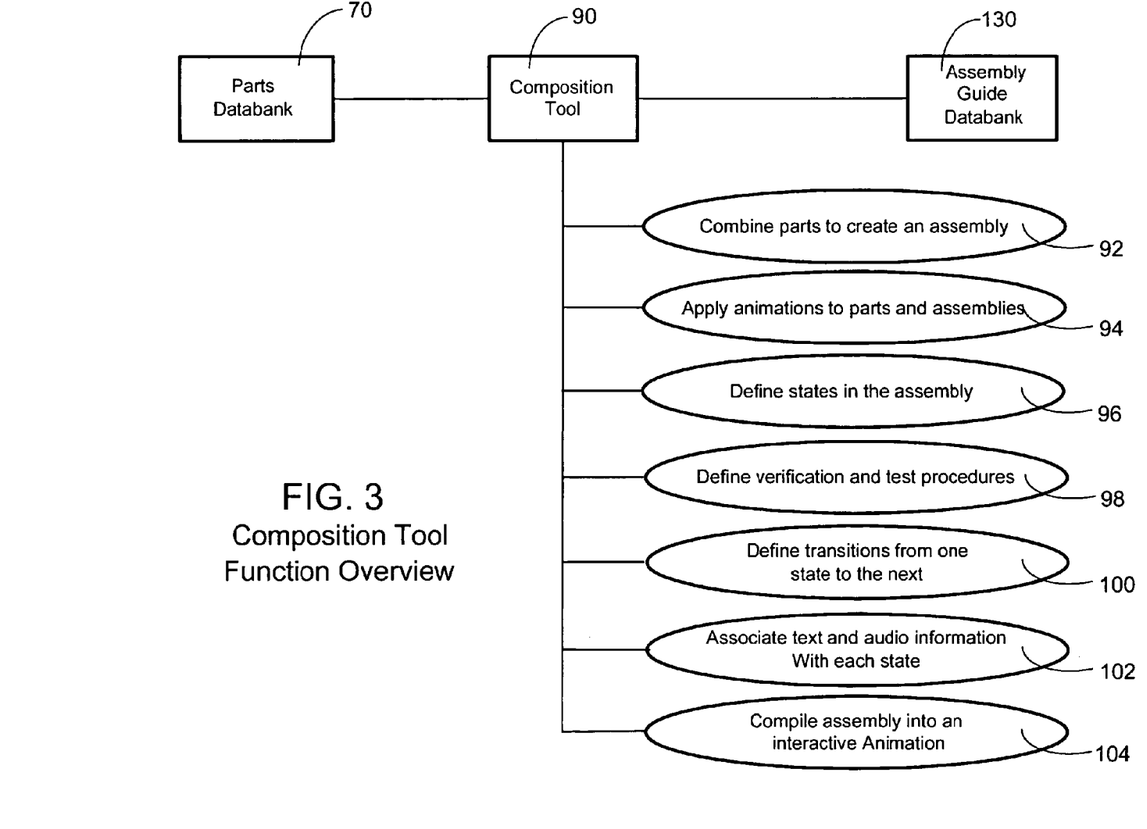
FIG. 3 is a block diagram which lists the successive major elements for the composition tool.

Composition tool (90) allows the user to define assemblies interactively through the use of a drag-and-drop user interface. Parts are properly positioned though the use of the connection information added by design tool (50). Thus it is possible to identify where a part can and cannot be placed in relation to the other parts already in the assembly.

If the user positions the part close enough to an acceptable location, composition tool (90) will automatically move the part to the acceptable location. Of course if composition tool (90) chooses the wrong location, the user is free to move the part to another location.

The user can also apply animations to the part with composition tool (90). These animations can be predefined animations stored in graphics databank (30) or recorded directly through composition tool (90). Also, composition tool (90) can generate some animations automatically based on the initial and final positions of the part.

Along with the animations, the user has the option to supply text and/or audio recordings that will be presented to the worker while the assembly guide is played. It is also possible to supply text and/or audio recordings in multiple languages, which can be selected when the worker views the assembly guide with assembly guide player (150).

As an alternative to the drag-and-drop user interface, wizards are available that lead the user through the process of identifying each step of the assembly process. After the wizard has collected all of the necessary information, it will automatically generate the assembly.

Whether by using the drag-and-drop user interface or by using a wizard, composition tool (90) creates the necessary states that drive the assembly guide. These states may be manually edited using dialog boxes. It is also possible to create an assembly guide solely using these dialog boxes.

These dialog boxes can also be used to add specialized states to interact with the worker though the keyboard and mouse, access a database, or communicate with external devices. When these states are executed as part of the assembly guide, the results can be used to determine which state is processed next, thus making an assembly guide that is truly interactive.

Composition tool (90) also has the ability to test an assembly guide directly from within the application. This allows the user to preview the display that will be presented to the worker and make any changes to the assembly guide through a series of dialog boxes.

Once the assembly has been defined and tested, it is saved into assemblies databank (110). From there it can be retrieved by composition tool (90) for further editing or compiled into an assembly guide, which is then saved into the assembly guide databank (130) where it can be played by assembly guide player (150).

Running An Assembly Guide With Assembly Guide Player (150)

Figure 4:
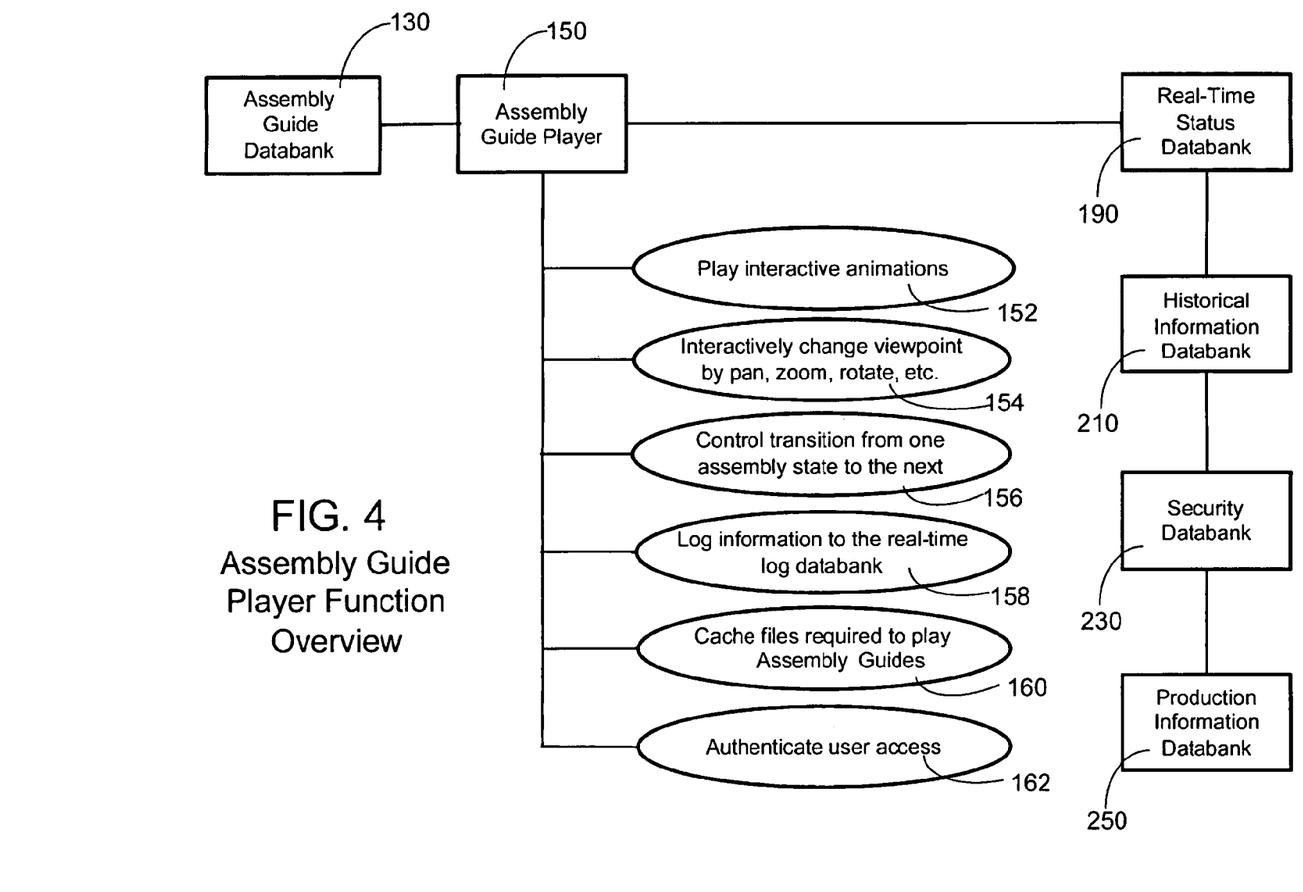
FIG. 4 is a block diagram which illustrates the successive functions in operating the assembly guide player.

An assembly guide created by composition tool (90) is played back using assembly guide player (150) (see FIG. 4). Assembly guide player (150) includes only enough functionality to play the assembly guide, but does not allow anyone to edit or even browse the contents.

Assembly guide player (150) generally takes one of three main forms: standalone, web-based, or embedded. The standalone form of assembly guide player (150) runs the assembly guide as a normal application on a computer system with graphical capabilities such as those running the Microsoft Windows, Apple Macintosh, or Linux operating systems. The graphical capabilities are important since the standalone version of assembly guide player (150) relies on the native facilities of the operating system to display the three-dimensional graphics.

The standalone version of assembly guide player (150) provides a framework for executing an assembly guide. In creating an assembly guide for use with the standalone version of assembly guide player (150), the user must rely solely on the scripting capabilities within the assembly guide in order to control the how the worker interacts with the assembly guide. Typically this form of assembly guide player (150) would be used to present simple assembly instructions to the worker.

The standalone version of assembly guide player (150) also has the capability to access resources local to the computer, which means that it may be practical to develop complex assembly guides that take advantage of these resources. For example, it might be possible to create a virtual three-dimensional world that provides an alternate user interface to the underlying resources of the host operating system.

The web-based version of assembly guide player (150) is similar to the standalone version in that the user is limited to controlling the assembly guide via the scripting language used within the assembly guide. However, in developing an assembly guide to be viewed with the web-based version of assembly guide player (150), the user should recognize that the assembly guide is being played over a network. As a result, some resources may not be instantly available as would be the case if the assembly guide were being played using the standalone version of assembly guide player (150).

The embedded version of assembly guide player (150) provides the user with the ability to control the assembly guide based on the application hosting the embedded version of assembly guide player (150). This allows the user greater freedom to present information to the worker and to perform more complex animations than can be performed using the standalone or web-based versions of assembly guide player (150).

The embedded version of assembly guide player (150) could be used in situations where a more traditional two-dimensional application already exists and the user wishes to add the ability to display three dimensional graphics without completely redesigning the existing application.

Other cases where the embedded version of assembly guide player (150) might be used include applications where the scripting language is not sufficient for the type of processing required by the application. In this case, the main application uses the facilities of the embedded version of assembly guide player (150) to load and display the desired three-dimensional graphics.

Another situation where the embedded version of assembly guide player (150) would be useful is when designing testing applications. At various stages through the assembly process, the hosting program can perform various tests and display the results in the three-dimensional display. As errors are detected, the three-dimensional display can be used to display information that can be used to troubleshoot and correct the error.

All three versions of assembly guide player (150) include certain core functionality, including the ability to transition from one state in the assembly guide to the next, thus presenting the assembly guide to the worker.

Assembly guide player (150) also includes the ability to respond to keyboard and mouse input from the worker. This information can be used to trigger the scripts associated with the assembly guide or to control how the assembly guide is presented by panning, zooming, and rotating the virtual camera used in the scene.

In addition to these core functions, assembly guide player (150) has the ability to authenticate a worker and, based on the worker's security credentials, determine which functions within the assembly guide they may access.

Information collected during the playback of the assembly guide may also be logged to real-time status databank (190) for later analysis using the reporting facilities available in administrative utility (270).

To improve performance, especially in the web-based version of assembly guide player (150), all versions of assembly guide player (150) have the ability to create a local cache of files that have been previously accessed in local caching databank (170). The assembly guide player (150) can determine whether the locally cached version of each required file is current and use the locally cached file rather than downloading the file each time it is needed.

Managing Assembly Guides With Administrative Utility (270)

Figure 5:
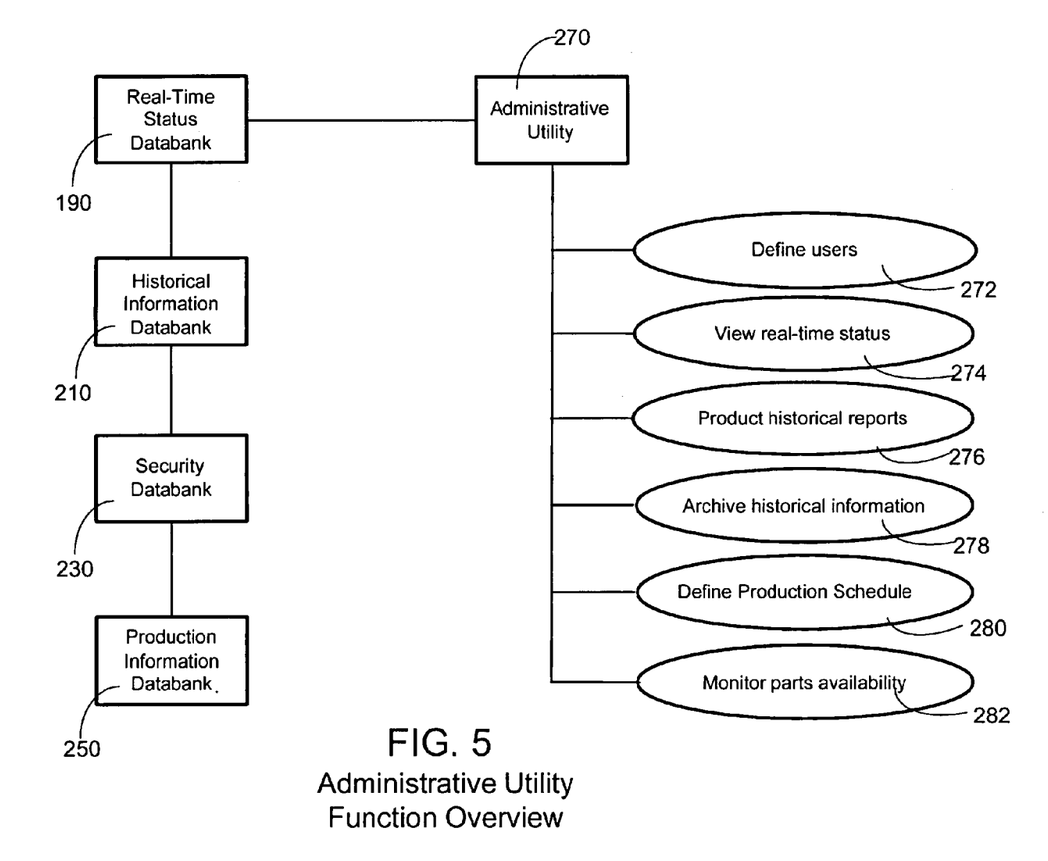
FIG. 5 is a block diagram which illustrates the functions available in the administrative utility.

Rather than performing a single function like assembly guide player (150) and composition tool (90), administrative utility (270) provides a collection of functions that allow administrative control over how the other components of the system for creating assembly guides work (see FIG. 5.). These functions work by examining and/or changing the information in the various databanks associated with the components of the system.

Define user function (272) allows an administrator to create new users and workers and edit the attributes associated with an existing user or worker. These attributes include specific information about the user or worker, along with security information about that person's access to the information in the various databanks in the system, along with the functions within each assembly guide that may be performed by each user and each worker.

Real-time status function (274) allows an administrator to monitor information collected from all assembly guide players (150) in the system. This allows the administrator to watch overall performance and identify potential problems and resolve them in a timely fashion.

Historical reporting function (276) allows an administrator to generate pre-defined and custom written reports using the data available in any databank in the system. These reports may be viewed online, printed, saved as a file, saved as a web page, or sent as email to make the information as available as the administrator desires. In addition, the security system is used to limit user access to reports by verifying the user has the appropriate authority to access a specific report.

In addition to producing historical reports, functions are included such that the administrator may archive selected information in the databanks. This information could be stored online for immediate retrieval, online in a compacted format, or offline in such as way as it could be brought online quickly if needed.

The ability to define the production schedule is important because the production schedule determines the order in which to present assembly instructions to the worker. There are three basic approaches to making this information available. The first approach involves manually entering the production schedule into the system.

The second approach to making production scheduling information available to the system uses general-purpose utility to extract the production schedule information from an external data source. The extraction can be performed on either a real-time or a prescheduled basis.

The final approach to making production scheduling information available to the system is to allow the worker to select the particular unit that they are about to build using assembly guide player (150).

Monitoring parts availability is also important to the system. Like production schedules, it is possible to enter the number of parts available directly into the appropriate databank or to extract the information on either a real-time or a prescheduled basis from an external data source.

The last function in the administrative utility (270) provides the administrator with the ability to schedule tasks for later execution. This allows the administrator to identify when and how often a particular task should be executed. For example, the administrator can generate reports in the evening and have them automatically emailed directly to the recipients. Likewise, the same scheduling tool could be used to periodically extract scheduling and parts availability information from external data sources.

Like the other components of the system, administrative utility (270) is easily extended with new features and new utilities using the plug-in approach.

Visual Clues And Assembly Guides

A three-dimensional graphic is composed of a number of different components, including groups, animations, and meshes. Associated with each of these components is a unique name. Using this name, it is possible to extract information about the particular object. Depending on the component, information such as size, shape, and location can easily determined.

While this information is typically used to display the three-dimensional graphic, it is also possible to use this same information in other ways. For instance, assume that a three-dimensional graphic represents a particular part used in an assembly. A visual clue can be added wherever a screw hole exists in the part. In this case the visual clue would take the form of a cylindrical mesh that occupies the hole.

The cylindrical mesh contains information such as the size of the hole and the relative location of the hole within the part. This information can be used in combination with similar information in the graphic for a different part to determine if the two parts can be connected together.

If the two parts can be connected together, then this information may also be used to help position the parts. If the person using composition tool (90) has moved one part containing visual clues sufficiently close to a second part containing compatible visual clues, then composition tool (90) can automatically move the first part to the proper location on the second part.

Note that the visual clues need not be shown when the three-dimensional graphic is displayed on the screen. For example, a visual clue that represents a hole in a part should not be shown on the display because it is not part of the part. In other situations, the visual clue may or may not be shown depending on how the visual clue is related to the component it is associated with.

Another way that visual clues embedded into a three-dimensional graphic may be used is to define areas surrounding a part that must be kept clear of other parts. Thus composition tool (90) can determine when the user moves a part into this area and automatically prevent the user from moving it too close to the other part.

A visual clue can also be associated with animation information, allowing it to move over time with respect to the part. This information can be useful when determining paths other objects must take when interacting with the part.

For example, the animation information can be used to determine how to position a virtual camera to look at the object. This approach is useful in assembly guide player (150) since it provides an easy way to look closely as to how two parts may be connected.

States Within An Assembly Guide

Each step of an assembly guide is represented by a distinct state. FIG. 6 depicts the different types of states typically found in an assembly guide.

An individual state includes information that determines the default type of processing that will be performed at that point in time. Static information for a state can be stored in a series of properties, which allows the user to perform specific tasks within a given state.

Methods are available to hold scripting code supplied by the user, which can be called from with the current state or used to modify the information stored in another state.

A state also contains a series of events. Each event contains a block of code supplied by the user that will be executed whenever assembly guide player (150) encounters a particular situation.

Note that wizards can automatically generate scripting code for both methods and events, thus simplifying the process of creating an assembly guide.

Global state (302) is unique in that the information contained in its resources is available to all other states as if the information were local to that particular state. If a resource with the same name exists in both global state (302) and another state, the information in the resource in the other state will be used first.

Each assembly guide begins in an initial state (304). This state allows the assembly guide to perform any tasks that are needed before displaying the assembly guide.

When playback of an assembly guide is finished, control is transferred to termination state (306). This state allows the assembly guide to reset so that it is ready to be played again.

An assembly state (308) is associated with each individual step of the assembly process. This state defines the particular component that should be installed during this step and how it should be shown on the display. It also includes a countdown timer, which will transfer control to the next state when the timer reaches zero.

Animation state (316) allows the user to specify how a three-dimensional object displayed on screen is moved or what type of special effect is applies to the object. When the animation or effect is complete, control is transferred to the next state.

Interrupt states (316) exist to handle situations as they occur. These situations may be in response to a hardware device sending a message to the computer or receiving a message from an external computer. When an interrupt state (316) is entered, the current state is preserved and when the interrupt state (316) is complete, by default control will be return to the state that was interrupted. However, it is possible override this action and transfer control to any desired state. In this case, the preserved information from the interrupted state will be lost.

Error states (320) are similar to interrupt state (316) in that control can be transferred to the state whenever an error occurs. This allows the user to attempt to recover from the error and continue processing normally.

Data states (322) are used to communicate with the system's databanks or external data sources. Among other things, data states (322) allow the user to record information into the log databanks or access information about the production schedule. In addition to these types of tasks, data states (322) also permit users to access external data sources where they can keep any information they desire.

Test states (314) may also be utilized to allow the user to verify that the assembly was done correctly and/or that the installed parts are working properly. Test states (314) allow the worker to perform manual and/or automated tests of the assembly. Note that the assembly process need not be complete prior to running a test.

The user may also add control states (312) that permit interaction with the worker via the keyboard or mouse.

In addition to these states, the user may also define external states (318) that provide the ability to perform tasks external to the assembly guide. External states (318) exist to handle unusual situations by running an external program.

Other states can be added to simplify the amount of work the user has to perform to create an assembly guide. Also it should be noted that it is possible to use one type of state to perform the processing normally associated with a different type of state through the use of the scripting language.

There can only be one active state at any point in time while playing an assembly guide. This is known as the current state. The current state has complete control over the assembly guide until it is replaced with a new state.

The current state may be replaced by one of two ways. First, the current state may directly transfer control to another state. This may be in response to an input from a worker, a timer reaching zero, or some other external event. The second way the current state may be changed is when an interrupt occurs and an interrupt state (316) is loaded. When it has finished processing, the interrupt state (316) has the option to return to the previous state or to jump to a new state.

Smart Objects

Smart objects represent the combination of a three-dimensional graphic with scripting code that is tightly coupled with the graphic. The tight coupling between the code and graphic ensures that the object will behave in a predictable fashion and simplifies the work required to use the object in an assembly guide.

The code associated with a smart object is used in both composition tool (90) and assembly guide player (150) albeit in different ways. Composition tool (90) uses the code to perform functions related to incorporating the graphic into an assembly guide. This includes functions such as controlling the position of the graphic with respect to other objects in the assembly guide or controlling how the graphic is animated.

Assembly guide player (150) uses the code in a different manner. Assembly guide player (150) can invoke the code directly from any state in the assembly guide or in response to the worker interacting with the graphic. This code is called prior to running any other code in the assembly guide, thus allowing the smart object to control how it is used.

Note that the code used by composition tool (90) and assembly guide player (150) exists in the same graphic. This is possible because composition tool (90) and assembly guide player (150) will invoke different properties, methods, and events depending on the function the graphic needs to perform.

Tools

Graphical objects that represent something other than a part or assembly are known as tools. Tools are typically things like screwdrivers and wrenches that are used to attach one part to another. A tool can also be a virtual object, such as an arrow, that serves to clarify information displayed on the screen.

Tools are a good example of smart objects because the code included with the tool can control how it is animated on the screen. In the case of a screwdriver, the tool's properties would identify the graphics associated with the screw to be installed and the desired location for the screw in the assembly. Then the assembly guide would show the screwdriver tightening the screw into the assembly.

Multilingual Capabilities In Assembly Guides

One of the key features of an assembly guide is its ability to communicate information without words. However, it is often desirable to include a short description along with the graphics that serve to clarify what is happening. This is useful when the user wishes point out a specific part number that might not be visible on the screen or caution the worker about a potential situation.

To accommodate the range of languages that may be spoken by the workers viewing the assembly instructions, an assembly guide includes the ability to store textual information for multiple languages. Assembly guide player (150) includes the ability to switch languages on the fly, thus allowing one worker to substitute for another in the middle of the assembly process.

In addition to displaying textual information on the screen, assembly guide player (150) also includes the ability to play a different sound clip based on the currently selected language. The sound clip can be a prerecorded sound file or generated by a speech synthesis engine.

Animations and Special Effects

Typically an animation is played whenever a new part is added to the assembly. This animation can be chosen from the set of stock animations supplied with composition tool (90), the collection of animations extracted from the model, or by creating a custom animation using the interactive animation editor packaged with composition tool (90).

The interactive animation editor captures the onscreen movement of a part as the user drags it around the screen. This information is then translated into an animation that can be played by assembly guide player (150).

It is also possible to adjust an animation using the same interactive animation editor. The path the part takes may be dragged around on the screen and the editor will record the changes for the animation automatically.

Composition tool (90) can also automatically generate an animation based on a particular starting and destination location for the part. Composition tool (90) takes this information and computes a path that places the part in the desired location while avoiding any other parts that may already be installed. When complete, the user has the option to modify the default animation using the interactive animation editor.

Once an animation is selected, the amount of time that the animation will run is also determined. While composition tool (90) determines a default time value based in the information it has available, this value can be easily overridden, thus allowing a user to directly modify the amount of time spent in each state and indirectly the amount of time that an assembly guide will play.

Working with External Devices

In addition to the keyboard, mouse, and computer display, the system is also capable of working with other external devices such as printers, bar code scanners, printers, and other off-the-shelf hardware components. The system also supports custom designed hardware components that connect though standard I/O ports or through the use of internal adapter cards.

The ability of the system to work with external devices means a user can create various hardware driven tests that verify that the assemblies are properly constructed.

Typically input from a device would be returned to an assembly guide via an interrupt state. Thus the assembly guide can respond to the input data immediately. It is also possible for scripting code to interact with the hardware directly, thus allowing access to the hardware from any state in an assembly guide.

Security In Assembly Guides

Security, which is managed using administrative utility (270), performs two main functions, authentication (162), which is used to determine an individual's identity, and authorization (272), which determines the functions and the data the individual may access.

Authentication (162) is important because it uniquely identifies an individual. This makes is possible to link an individual to other information in the databanks, such as the assemblies they are certified to build or the individual assemblies they have created.

Authorization (272) determines the particular functions an authenticated individual may perform. One way this may work is to ensure that a worker has completed the appropriate training prior to assembling a particular unit on the assembly line. Another area where authorization is important is that it ensures that only the appropriate individuals may access tools within administrative utility (270).

Extending Assembly Guides

To ensure that an assembly guide can handle unanticipated needs, it is important that its architecture must be extendable. To that end, the system has the ability to use plug-ins. A plug-in is an object code module that is dynamically incorporated into the overall system's run-time environment.

Plug-ins include additional objects that can be manipulated by an assembly guide. These objects can perform a number of different things such as defining new types of states that can be used within an assembly guide; including wizards that can reduce the amount of work needed to create an assembly guide; and adding new programming libraries that provide utility functions for scripting programmers.

Plug-ins are defined in three ways. First, a plug-in can be defined in a specific assembly guide and loaded only when that particular assembly guide is played. Second, a plug-in can be defined for a specific component of the system, such as composition tool (90) and loaded whenever that particular component is started. Finally, a plug-in can be defined as global, which means that it will be automatically loaded each time any component in the system is started.

Example #1

Building a Simple Assembly Guide

Assume that a company wishes to create an assembly guide for an electric fan. The fan consists of the following five parts: motor, fan blades, housing, electric cord, and grill.

In this example, the process of creating the work instructions begins by using a three-dimensional graphics tool to create individual objects of each of the parts as follows:

Within the motor graphic, the shaft of the motor is labeled with a visual clue for attaching the fan blades to the motor; the mounting screw holes of the motor are labeled with a visual clue for attaching the motor to the housing and the attachment screws on the motor are labeled with visual clues for attaching the electric cord to the motor.

Within the fan blades graphic, the center hole of the fan blade is labeled with a visual clue for attaching the fan blades to the motor shaft.

Within the housing graphic, the mounting bracket is labeled with a visual clue for attaching the motor and the screw holes that are used to attach the grill are also labeled with visual clues.

Within the grill graphic, the attachment points that connect the grill to the housing are labeled with visual clues.

Within the electric cord graphic, the ends of the wires that are attached to the motor are labeled with visual clues.

Once the three-dimensional graphics are created, they are stored in graphics databank (30), where they are processed using design tool (50). Design tool (50) examines the visual clues contained in each graphic and extracts the information about how each part may be connected from the visual clues associated with the part. Additional information for each part, such as a description for each, is also entered at this time. Finally, each part is saved into parts databank (70).

Once all of the parts needed to assemble the fan are available in parts databank (70), composition tool (90) is used to combine the individual parts into an assembly. The first step in this process is to use composition tool (90) to create a new assembly.

Composition tool (90) displays a list of parts that can be used in the assembly along with a graphical representation of the assembly. In this example, the first part to be added to the assembly is the housing. The housing is added to the assembly by dragging it into the window containing the graphical representation.

The second part to be added to the assembly is the motor. The motor is selected from the list of parts and dragged onto the graphical representation of the assembly. When the motor is close to the correct location on the housing, the connection points for the motor on the housing are highlighted. Dropping the motor while the connection points are highlighted results in the motor being positioned in the correct location in the housing.

The third part to be added to the assembly is the electric cord. The electric cord is placed into the assembly in the same fashion as the electric motor. When the electric cord is sufficiently close to the attachment screws, the attachment screws are highlighted. Dropping the electric cord into the window while the attachment screws are highlighted results in the electric cord being attached to the screws automatically.

The fan blades are the fourth part to be added to the fan. Like the previous two parts, dragging the fan blades close enough to the proper location on the motor results in the motor shaft being highlighted. Dropping the fan blades then automatically places them in the proper place in the assembly.

Finally, the grill is attached to the housing by dragging and dropping it in the appropriate location.

When all of the parts have been added to the assembly, the assembly guide associated with the assembly process can be previewed within composition tool (90). By default, composition tool (90) will automatically include animations with each part that moves from off-screen into its proper location on the assembly. Thus when the preview is played, it would appear that the assembly is being put together one part at a time.

Once the assembly has been created, it is easy to adjust the information associated with the assembly guide. Selecting a particular part allows the person using composition tool (90) to change its properties, including the text displayed for each part and the time the assembly guide will take to play.

After adjusting the properties to create the desired assembly instructions, the assembly guide is compiled and saved to assembly guide databank (130) where someone using the assembly guide player (150) can view it.

Now that the assembly guide containing the assembly instructions is complete, administrative utility (270) is used to define the security options for the assembly guide.

The last step in this process is to use assembly guide player (150) to view the assembly guide. When assembly guide player is started, a default assembly guide is played. In the case of workers assembling fans, the fan assembly instructions would be loaded as the default assembly guide from assembly guide databank (130).

When playback of the assembly guide is finished and the worker has seen the assembly instructions to assemble a single fan, playback of the assembly guide starts again and remains in this loop until the worker closes assembly guide player (150).

While the assembly guide is playing, the worker has the ability to perform certain basic functions such as pausing and resuming the playback; zooming in to see a particular part of the assembly close up; or panning left, right, up and down to look at different parts of the assembly process. The worker also has the ability to quickly restore the display to its default setting so as to see the assembly guide in its default form.

Example #2

Substituting Parts Within An Assembly Guide

Assume that the company that built the fan in Example #1 wishes to substitute a different motor for the one currently installed in the fan. The new motor is compatible with the existing mounting brackets in the housing and uses the same fan blades and electric cord used in the current fan assembly. Also, the new motor is purchased from an external supplier.

The external supplier has a three-dimensional CAD/CAM drawing of the new motor. This drawing is loaded directly into design tool (50). Since the CAD/CAM drawing does not include visual clues, the information must be entered using design tool (50).

The shaft of the new motor is selected and marked as a connection point for the fan blade. The mounting screw holes are marked as connection points for mounting the new motor in the housing. Finally the attachment screws are marked as connection points for the electric cord.

Within the motor graphic, the shaft is labeled with a visual clue for attaching the fan blades to the motor; the mounting screw holes are labeled with a visual clue for attaching the motor to the housing; and the attachment screws are labeled with visual clues for attaching the electric cord to the motor.

Note that the part name for the new motor will be different than the previous motor as it represents a new part. Likewise, additional information such as the name of the supplier and the part number assigned by the supplier are added to this particular part. Once the changes are made to the new motor, it is then saved into parts databank (70).

The existing assembly, which was stored in assemblies databank (110) is then opened with composition tool (90) for editing. The old motor is selected and the part name of the new motor is substituted. All of the previous information associated with the old motor remains, including the text and the installation time. This information is then updated if necessary and the updated assembly is saved to assemblies databank (110). Finally, the updated assembly is compiled and saved to assembly guide databank (130), replacing the old assembly.

The next time someone uses assembly guide player (150) to play this assembly guide, the new assembly will be loaded and the user will see assembly instructions for the fan using the new motor.

Example #3

Adding Multi-Lingual Capabilities

Assume that the company producing the fan now wishes to present the assembly instructions in multiple languages. The user simply opens the existing assembly, which was stored in assemblies databank (110), using composition tool (90) and views the text associated with each individual part.

Rather than changing the text for a specific part, the user simply adds a new text field for the new language and enters the text that describes this step of the assembly process in the language chosen. This process is repeated for each part in the assembly.

In addition to choosing the text for each step of the assembly process, the user has the option to record an audio track in each language for each part so that the worker assembling the fan can listen to the instructions as well as reading the text.

Once these changes are complete, the assembly guide is saved to assemblies databank (110). Composition tool (90) is then used to compile the updated assembly guide and store it in assembly guide databank (130), which allows the workers to view the updated assembly instructions. When assembly guide player (150) is launched, the default language for that computer is selected and all assembly guides are played using that default language. However a worker can choose a different language while an assembly guide is playing, thus reading and hearing the assembly instructions in the language of their choice.

Example #4

Testing An Assembly

Simply assembling a product is not sufficient in order to meet the quality goals of most companies. Thus it is important to test each assembled product before it is packaged for shipment.

The system allows scripting code to be included in each state. This means that it is possible for an assembly guide to interact with external hardware by writing the appropriate scripting code.

Assume for this example that a custom fan tester is available that performs the following checks on the fan: tests for short circuits in the motor, tests that the fan blades are generating airflow, and tests that the fan oscillates properly. Also assume that an external program interfaces with the fan tester and that this external program can be called from a script included with the assembly guide.

To add the testing functions, the user creates a three-dimensional graphic of the custom fan tester and stores it in graphics databank (30). Also the user has the option to add animations that make the fan blades spin along with allowing the housing to oscillate from side to side. Once these changes are made to the existing three-dimensional graphics, they are also saved to graphics databank (30).

Design tool (50) is then used to load the graphics from graphics databank (30) and to update the information in parts databank (70). In this situation, the fan tester is marked as a reusable tool rather than as a part in parts databank (70). This allows a single repository to be used, simplifying the design process.

Once the information in parts databank (70) has been updated, the user opens the existing set of assembly instructions, stored in assemblies databank (110) using composition tool (90) to modify the list of states in the current set assembly instructions. In this example, the testing will be done when the fan is completely assembled, so none of the existing states need to be modified. All of the new states will be added to the end of the process.

The first step in testing a fan is to place the completed fan into the fan tester. This means that the user must drag the tester from the virtual parts bin onto the graphical display in a different location than the fan itself. Then the user will create a new animation by selecting the assembled fan and moving it into the fan tester. After that is complete, a new state is created; then a new animation is created that moves the plug of the electric cord into the fan tester's electrical outlet.

Once the fan is properly hooked up in the fan tester, a new state is created that runs the first test. In this case, it calls the external program to check for short circuits in the motor. If the test is not successful, control will transfer to a new state where the electric cord and motor are highlighted and a message would appear on the screen saying that the test program encountered a short circuit in the motor. The program could either be a short circuit in the cord or in the motor.

Depending on how the user wants to handle the failed test, the user could have the animation zoom to the typical failure areas such as the place where the electric cord is connected to the motor and ask the worker to verify that the electric cord was installed properly. The worker could respond via a keyboard or other input device either "yes" the electric cord was installed properly or "no" the electric cord was not installed properly.

If the electric cord was not installed properly, the worker would then be instructed to remove the electric cord and reinstall it using the same assembly instructions shown earlier. Once the problem was corrected, instructions would appear on the screen telling the worker to rerun the test.

If the short circuit test is successful, the next test is run to verify that the fan blades are generating airflow. A sensor in the fan tester detects the airflow. If no airflow was detected, the fan blades would be highlighted on the animation and the problem would be reported to the worker.

If the airflow test was successful, the script program would play the animation of the fan blade spinning. Then the oscillation test would begin. Additional airflow sensors in the fan tester would verify that the air stream generated by the fan blades moved in a periodic fashion. If the test was successful, the script would then play the oscillation animation. Otherwise the worker would be informed that the fan did not pass this test.

Assuming that all of the tests were successful, the worker would be informed that all of the tests were passed. Then assembly instructions would be shown showing the worker how to remove the fan from the tester.

Example #5

Implementing Fences, Schedules, and Statistics

The previous examples provided a simplistic view of the capabilities of this architecture, but a more realistic example would allow for the fact that multiple people may be assembling a product, such as one person starts with the housing and then installs the motor and electric cord. Then the partially completed fan is passed onto another person who installs the fan blades and grill to finish assembling the product. Finally, a third person runs a series of diagnostic tests on the fan to insure that all of the components work properly.

In addition, these examples assumed that only one type of fan was assembled. A more typical manufacturing situation would involve building multiple types of fans using the same assembly line. The exact type of fan that needs to be assembled would be dictated by the production schedule.

Finally, it would be highly desirable to record statistics about each fan produced. This information would be saved in production information databank (250). This would allow the user to determine such information as the ratio of the number of fans that passed their test successfully versus the number of fans that failed the test, the number of fans assembled by each worker, and many other statistics.

Implementing these changes begins with launching composition tool (90) and opening the assembly instructions for the fan stored in assemblies databank (110). Additional states are inserted into the assembly instructions to control the fences. The assembly instructions are then compiled into an assembly guide, which is then stored in assembly guide databank (130). The initial state in the assembly guide determines the station assigned to the current worker and plays the states related to that phase of the assembly and testing process. When the assembly guide reaches the end of the assembly instructions for that worker's station, it loops back to the beginning and starts over again.

With the fences in place, additional states are added to record information for each fan that each worker assembles. The information logged to the production information databank (250) includes: the serial number assigned to the fan, the amount of time it took the worker to perform their assigned task, and any special functions performed while viewing the assembly guide such as zooming, panning, etc.

The assembly instructions assigned to the first worker would also be modified to instruct the worker to tag each fan with a serial number. Two different approaches might be used. A printer attached to the first station would print the serial number each time the worker started a new unit. Alternatively, a worker could pull a new tag with a serial number from a page of tags and use a scanner to read the new serial number into the computer.

In each subsequent station, instructions would be added tell each worker to scan the serial number of each fan before adding any new parts. This information would also be recorded in the appropriate databanks for later analysis.

With these changes to the assembly guide complete, administrative utility (270) is used to enter the production schedule for the assembly line. The schedule consists of the type of fan being produced and the quantity to be assembled. Other information such as the range of serial numbers that are to be assigned to each assembled fan may also be included in the schedule.

On the assembly line, each assembly guide player (150) would be assigned a station number reflecting the station's relative position on the assembly line. Thus when the worker begins playing the assembly guide, the assembly guide will be able to determine which fenced section of the assembly instructions should be played.

When the worker begins working for the day, assembly guide player (150) will access the schedule stored in production information databank (250) to determine which type of fan should be assembled and the range of serial numbers to be used.

Periodically, the user will use administrative utility (270) to extract statistics from the data recorded by the assembly process. By analyzing this data, the user can determine if one part is failing more frequently than the rest, or if a series of failures can be traced back to a particular worker who is improperly following the assembly instructions. Also, the raw data recorded by the assembly process can be exported into other tools for more complex data analysis and reporting.

Those skilled in the art may appreciate that certain modifications may be made to the apparatus and methodology herein disclosed, without departing from the scope and spirit of the invention. While the invention has been described above with respect to the enumerated preferred embodiments, it should be understood that the invention may be adapted to numerous rearrangements, modifications and alterations and that all such are intended to be within the scope of the appended claims.

I claim:

1. A method performed on at least one computer, said at least one computer having a means for inputting, a means for displaying video, a means for playing audio files, and a means for storing, for creating and using an assembly guide to control the assembly of an article from a collection of parts based on a bill of material and assembly instructions, including using tools as required by said assembly instructions, testing said article using test fixtures as required by said assembly instructions, and capturing and recording production statistics and test results, said method comprising:
  identifying each part necessary to produce said article from said bill of material;
  identifying each tool necessary to produce said article from said assembly instructions;
  identifying each test fixture necessary to test said article from said assembly instructions;
  identifying the sequence of steps necessary to produce said article from said bill of material, said steps comprising individual states related to each part and each tool needed for the production of said article from said bill of material;
  creating a three-dimensional graphic representing each identified part;
  creating a three-dimensional graphic representing each identified tool;
  creating a three-dimensional graphic representing each identified test fixture;
  storing each graphic;
  annotating each graphic with visual clues to create an annotated graphic;
  storing said annotated graphics;
  generating said assembly guide using said annotated graphics and said sequence;
  storing said assembly guide;
  displaying said assembly guide where an assembler can view said assembly guide while said assembler is assembling said article from said discrete parts; and
  controlling access to said assembly guide;
  wherein said assembly guide is non-linear in nature and thus control may be transferred non-sequentially to one of several different states based on test results or worker responses during any stage of assembly of said article.

2. The method of claim 1 further comprising:
  signaling compliance with said assembly guide by said assembler.

3. The method of claim 2 wherein said step of annotating each graphic further comprises annotating said graphic with text instructions.

4. The method of claim 3 wherein said step of annotating each graphic further comprises annotating each graphic with a sound file containing oral assembly instructions.

5. The method of claim 4 further comprising playing back said sound file containing oral assembly instructions synchronously with displaying said assembly guide.

6. The method of claim 4 wherein said text instructions and said sound file containing oral instructions can be in a plurality of languages.

7. The method of claim 2 further comprising:
  identifying each step in said sequence wherein each identified test fixture is to be used;
  using each identified test fixture to test said article;
  capturing the result of each test; and
  storing the result of each test.

8. The method of claim 7 further comprising using each said test result to determine the next step in said sequence.

9. The method of claim 7 further comprising:
  capturing production statistics; and
  storing said production statistics.

10. The method of claim 1 further comprising:
  identifying sub-sequences to be performed by different assemblers at different work locations from said assembly instructions;
  using fences to define said sub-sequences in said assembly guide; and
  displaying only the portion of said assembly guide concerning the particular sub-sequence to be performed by a particular assembler.

11. A system for creating and using an assembly guide to control assembly of articles created from discrete parts according to a bill of material and a set of assembly instructions, said assembly guide specifying the use of tools as required by said assembly instructions and the use of test fixtures to test said articles as required by said assembly instructions, comprising:
  a graphics design tool for creating a graphic of each discrete part, each tool, and each test fixture;
  a first database in which each graphic is stored;
  a design tool for annotating each graphic with visual clues to create an annotated graphic;
  a second database in which each annotated graphic is stored;
  a composition tool for creating said assembly guide using said annotated graphics according to a sequence derived from said bill of materials;
  a third database in which said assembly guide is stored;
  an assembly guide player to display said annotated graphics on a means for displaying animated graphics; and
  an administrative utility to control access to said system;
  wherein said assembly guide player is run on a computer system; and
  wherein said animated graphics are displayed in a three-dimensional format.

12. The system of claim 11 further comprising:
  a plurality of assembly guides stored in said third database and a fourth database in which a schedule of production is stored whereby said assembly guide player accesses said schedule of production to determine which of said plurality of assembly guides should be displayed on said means for displaying animated graphics.

13. The system of claim 12 further comprising:
  a fourth database in which the results of said testing are stored.

14. The system of claim 13 wherein said test results determine the next step in said sequence.

15. An interactive assembly guide to show an assembly worker how to create an assembly from multiple discrete parts comprising:
  a sequence for combining said parts into an assembly including presentations of steps comprising individual states of assembly;
  a means for displaying said guide;
  a means for inputting information into said guide; and
  multiple three-dimensional graphic animations;
  wherein each of said multiple graphic animations relate to a discrete part within said guide, and wherein a user may control said assembly guide at one or more different non-sequential states during the assembly procedure.

16. The assembly guide of claim 15 wherein:
  said animations are displayed on said means for displaying;

and said graphics are combined following said sequence to create a graphic representing said assembly.

17. The assembly guide of claim 16 wherein an assembly worker signals compliance with each step in said sequence via said means for inputting.

18. The assembly guide of claim 17 wherein said sequence includes at least one test and the result of said at least one test is provided to said assembly guide.

19. The non-linear, animated, interactive assembly guide of claim 18 wherein the step in said sequence following said at lest one test depends on the result of said at least one test.

20. A non-linear, animated, interactive assembly guide of claim 17 wherein one or more fences divide said sequence into sub-sequences.

* * * * *